United States Patent
Di Giandomenico et al.

(10) Patent No.: US 8,565,692 B2
(45) Date of Patent: Oct. 22, 2013

(54) SYSTEM AND METHOD FOR PROVIDING A VERSATILE RF AND ANALOG FRONT-END FOR WIRELESS AND WIRED NETWORKS

(75) Inventors: Antonio Di Giandomenico, Velden am W. (AT); Peter Laaser, Munich (DE); Jeorg Hauptmann, Wernberg (AT); Andreas Wiesbauer, Poertschach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 1166 days.

(21) Appl. No.: 11/928,545

(22) Filed: Oct. 30, 2007

(65) Prior Publication Data

US 2009/0110088 A1 Apr. 30, 2009

(51) Int. Cl.
*H04B 1/40* (2006.01)

(52) U.S. Cl.
USPC ............... 455/76; 455/314; 455/315; 455/78; 455/83; 455/63.1; 455/249.1; 455/255; 455/258; 455/426.2; 725/151; 375/260; 375/340

(58) Field of Classification Search
USPC ......... 455/314, 315, 78, 83, 63.1, 249.1, 255, 455/258, 426.2; 725/151; 375/260, 340
See application file for complete search history.

(56) References Cited

U.S. PATENT DOCUMENTS

| | | | |
|---|---|---|---|
| 6,275,990 B1 * | 8/2001 | Dapper et al. | 725/106 |
| 7,310,522 B2 * | 12/2007 | Geile | 455/424 |
| 7,330,740 B2 * | 2/2008 | Bennett et al. | 455/574 |
| 7,385,916 B2 * | 6/2008 | Geile et al. | 370/208 |
| 7,400,572 B2 * | 7/2008 | Geile et al. | 370/203 |
| 7,414,960 B2 * | 8/2008 | Geile et al. | 370/203 |
| 7,414,961 B2 * | 8/2008 | Geile et al. | 370/203 |
| 7,417,944 B2 * | 8/2008 | Geile | 370/204 |
| 7,420,913 B2 * | 9/2008 | Geile et al. | 370/203 |
| 7,420,914 B2 * | 9/2008 | Geile et al. | 370/203 |
| 7,426,177 B2 * | 9/2008 | Geile et al. | 370/206 |
| 7,539,208 B2 * | 5/2009 | Chapman et al. | 370/466 |
| 7,623,440 B2 * | 11/2009 | Geile et al. | 370/204 |
| 7,630,361 B2 * | 12/2009 | Chapman et al. | 370/352 |
| 7,647,035 B2 * | 1/2010 | Rofougaran | 455/313 |
| 7,675,843 B2 * | 3/2010 | Geile | 370/206 |
| 7,680,227 B2 * | 3/2010 | Kavadias et al. | 375/354 |
| 7,710,319 B2 * | 5/2010 | Nassiri-Toussi et al. | 342/377 |
| 7,831,220 B2 * | 11/2010 | Hammerschmidt et al. | 455/114.1 |
| 7,864,686 B2 * | 1/2011 | Chapman et al. | 370/237 |
| 7,881,180 B2 * | 2/2011 | Geile et al. | 370/204 |
| 7,881,181 B2 * | 2/2011 | Dapper et al. | 370/206 |
| 7,983,141 B2 * | 7/2011 | Geile | 370/207 |
| 7,995,454 B2 * | 8/2011 | Geile et al. | 370/206 |
| 2004/0125787 A1 * | 7/2004 | May et al. | 370/350 |
| 2004/0172658 A1 * | 9/2004 | Rakib et al. | 725/120 |
| 2005/0186958 A1 * | 8/2005 | Hansen et al. | 455/426.2 |
| 2005/0286557 A1 * | 12/2005 | Sung et al. | 370/466 |
| 2006/0193271 A1 * | 8/2006 | Proctor et al. | 370/294 |
| 2009/0041004 A1 * | 2/2009 | Emmanuel | 370/352 |

FOREIGN PATENT DOCUMENTS

CN 1722723 A 1/2006

\* cited by examiner

*Primary Examiner* — April G Gonzales
(74) *Attorney, Agent, or Firm* — Slater & Matsil, L.L.P.

(57) ABSTRACT

Embodiments related to analog front-ends for wireless and wired are described and depicted.

30 Claims, 4 Drawing Sheets

SYSTEM AND METHOD FOR PROVIDING A VERSATILE RF AND ANALOG FRONT-END FOR WIRELESS AND WIRED NETWORKS

BACKGROUND

Home, business and commercial networks are becoming increasingly diverse and more often involve the interaction of both wireless local area networks (WLAN) and wired networks. A typical infrastructure for a home or business network includes one or more wireless or wired gateways, such as a modem or set-top box, to service one or more client applications or stations. As the client stations and applications in home and business networks become more diverse, the traditional gateway devices are unable to provide interfaces for all of the applications.

The gateway may, for example, be required to provide interfaces to mobile devices, such as laptops and personal digital assistants, and to provide interfaces to stationary devices, such as personal computers and consumer electronics. Each of the various devices and client applications may use different communication standards, protocols, frequencies or technology, such as, for example, wireless networks complying with the 802.11 standards and wired networks using twisted pair, cable or power line communication media. Accordingly, the known gateway devices may not support all of the client applications that a user desires to add to a home or business network.

SUMMARY OF THE INVENTION

Embodiments of the present invention include, for example, an access point or gateway for a data network. The access point comprises a plurality of front-end circuits coupled to MAC circuitry and a plurality of local oscillators (LOs). Each of the plurality of local oscillators may be selectively coupled to the front-end circuits. A particular LO signal is selected for each front-end circuit based upon a network to which that front-end circuit is to be coupled.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The present invention provides many applicable inventive concepts that can be embodied in a wide variety of specific contexts. The specific embodiments discussed are merely illustrative of specific ways to make and use the invention, and do not limit the scope of the invention. The following detailed description explains exemplary embodiments of the present invention. The description is not to be taken in a limiting sense, but is made only for the purpose of illustrating the general principles of embodiments of the invention. In the various figures, identical or similar entities, modules, devices etc. may have assigned the same reference number.

In the following, various embodiments will be described wherein analog front-ends of an access point may independently and concurrently service two or more client applications via two or more channels, frequencies, bands and/or networks. As will be described later in more detail, the independent and concurrent operation of the front-ends allow for flexible and dynamic configuration of the access point which may, for example, be used to optimize the data traffic to and from the various client applications by the access point.

Figure 1:
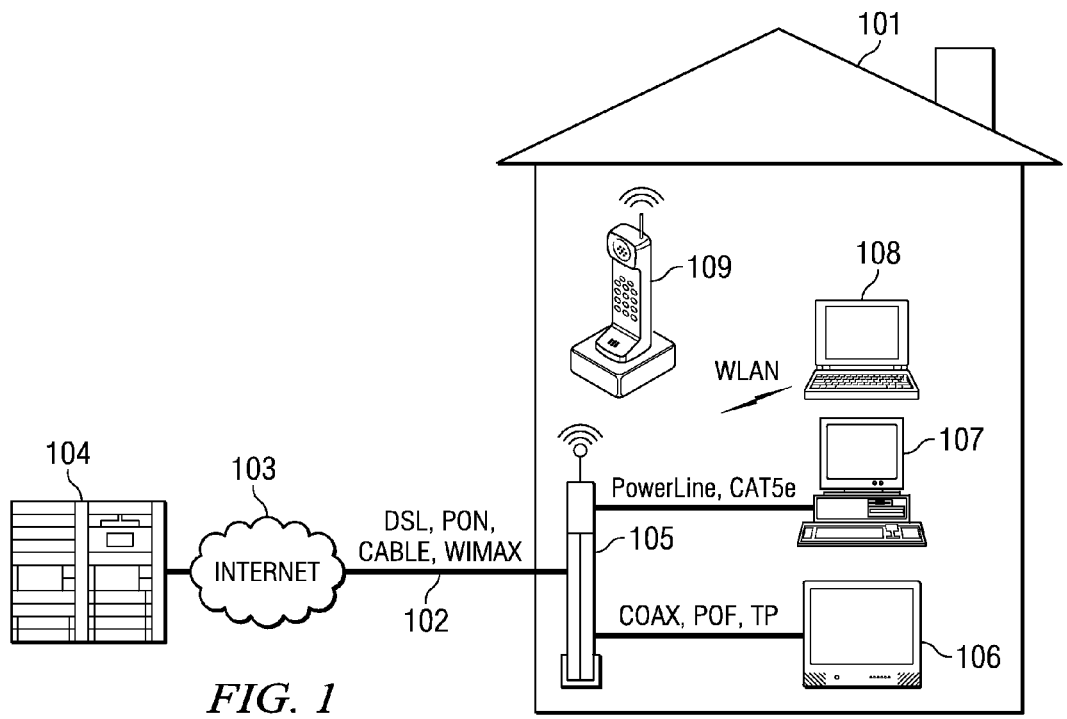
FIG. 1 illustrates an exemplary home data network.

FIG. 1 illustrates home network 101 in which data is provided via connection 102, such as an Ethernet connection from Internet 103 or from any other public or private data network. The data may originate, for example, from remote server 104. Connection 102 may use any wireline or wireless communication format, protocol or technology, such as, for example, digital subscriber line (DSL), cable, passive optical network (PON), WiMAX, or Broadband over Power Line (BPL). The data is received in home network 101 by access point 105, which may be, for example, a set-top box, broadband modem, or residential gateway. Access point 105 receives data packets over connection 102 and converts the data into formats that can be used by applications in home network 101, such as television 106, desktop personal computer (PC) 107, laptop computer 108, or telephone 109. The data may be distributed to the home network applications in one or more wireline and/or wireless formats, such as, for example, coaxial cable, twisted pair (TP), plastic optical fiber (POF), electrical power lines, CAT5e cable, wireless local area network (WLAN), Wi-Fi or IEEE 802.11 standards-compliant networks.

Access point 105 performs media access control and baseband (MAC/BB) processing of the received digital data packets on connection 102. The data must then be converted to a format specific to the desired home network application or component. Access point 105 also includes one or more analog front-ends that provide the interface to the home network applications. The analog front-ends may be designed specifically for a particular type of application. For example, a Wi-Fi or 802.11 front-end may provide an interface to WLAN applications, a separate coax front-end may provide an interface to television or cable set-top box applications, and separate twisted pair or power line front-ends may provide an interface to a desktop PC application.

Figure 2:
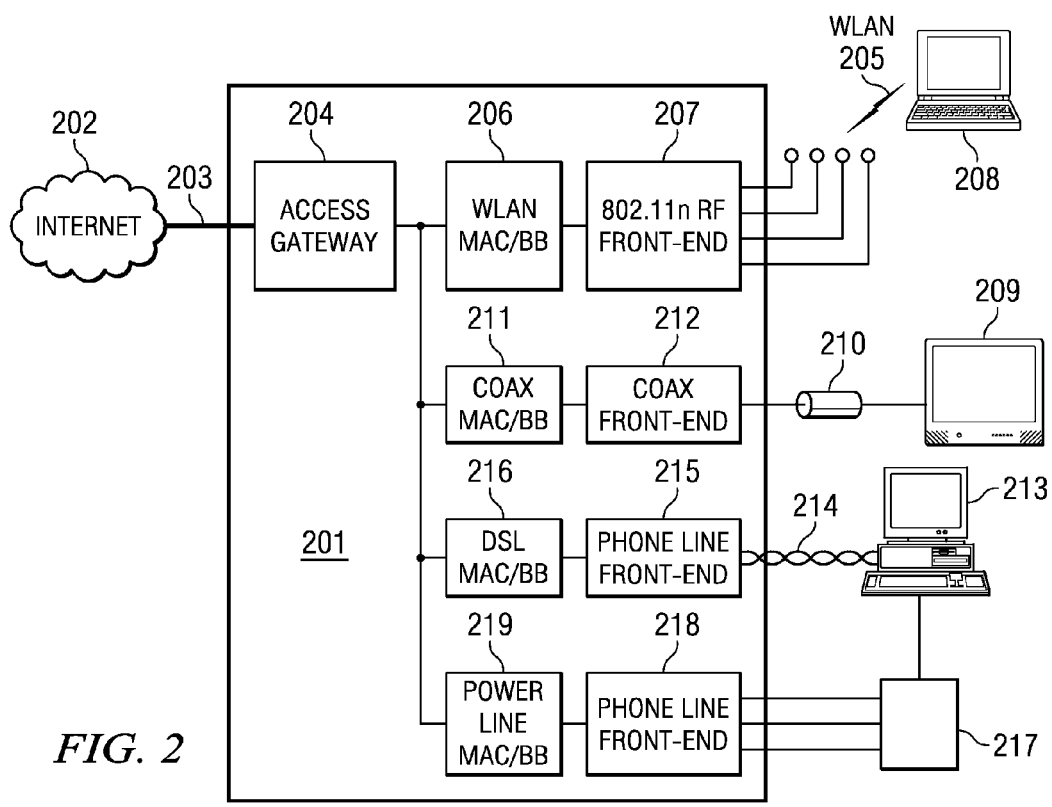
FIG. 2 illustrates an embodiment of an access point.

FIG. 2 is a block diagram of one embodiment of a home network access point 201. Data may be received from Internet 202 or other data network via, for example, cable, DSL or fiber connection 203. Access gateway 204 provides the interface to Internet 202 or other data network. Access point 201 may be coupled to WLAN 205 using WLAN MAC/BB processor 206 and RF front-end 207. Devices such as laptop computer 208, personal digital assistants (PDA), or other devices may be coupled to the WLAN network. Television 209 may also be coupled to access point 201 via coaxial cable 210 using coax MAC/BB processor 211 and coax front-end 212. Access point 201 may be coupled to desktop PC 213 via twisted pair 214, which may carry DSL signals, for example. Twisted pair 214 may be connected to phone line front-end 215 and DSL MAC/BB processor 216 in access point 201. In other embodiments, PC 213 may also be connected via power-line network 217, which is coupled to access point 201 via power line front-end 218 and power line MAC/BB 219.

Each of the front-end circuits 207, 212, 215, 218 and MAC/BB processors 206, 211, 216, 219 illustrated in the exemplary configuration of access point 201 are specific to the particular type of network to which they are attached and are typically on separate chips. For example, RF front-end 207 may be designed to interface with a WLAN network, such as an 802.11n network operating at 2.4 GHz or 5 GHz. Because of the network-specific design of RF front-end 207, it would not work with coax 210, which operates at approximately 800-900 MHz, or twisted pair 214 or power line network 217, which operate below 20 MHz. Accordingly, front-ends 207, 212, 214, and 218 are not interchangeable in known systems. The selection of specific types of front-ends limits the type and number of networks that can be connected to access point 201 in known systems.

Figure 3:
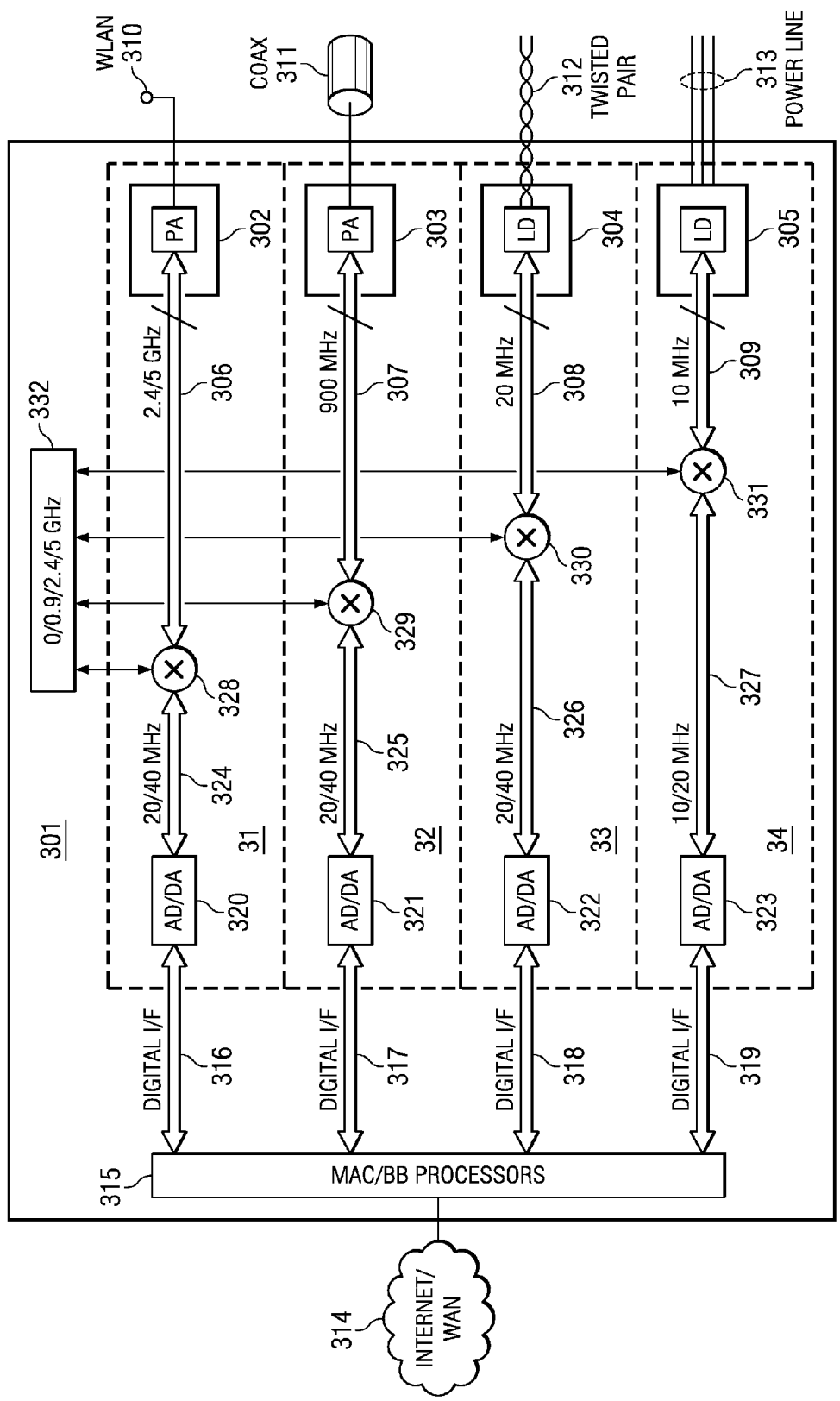
FIG. 3 illustrates an exemplary operation of an access point according to one embodiment of the invention.

FIG. 3 illustrates an embodiment of the invention in which access point 301 includes versatile front-ends 31-34 that can be programmed to operate with multiple digital signal input connections 316-319 and multiple networks 310-313. Front ends 31-34 may be provided on different chips or may be provided on a single chip. Signals from and to Internet 314 or other data networks are processed by MAC/BB processors 315, which convert data packets from network 314 into digital baseband signals 316-319. One embodiment of MAC/BB processing is described in co-pending, commonly assigned U.S. patent application Ser. No. 11/861,289, entitled "Wireless Local Area Network and Access Point for a Wireless Local Area Network," filed Sep. 26, 2007, the disclosure of which is hereby incorporated by reference herein in its entirety. Digital-to-Analog/Analog-to-Digital converters 320-323 then convert digital baseband signals 316-319 into analog baseband signals 324-327, which may be in one embodiment at 10-40 MHz, for example.

Analog baseband signals 324-327 are up-converted by mixers 328-331 to analog signals 306-309. Local oscillator (LO) 332 provides LO signals to mixers 328-331 that are used in the up-conversion. In one embodiment, LO 332 may be one or more phase locked loops that selectively produce LO frequencies of 10 MHz, 900 MHz, 2.4 GHz, and/or 5 GHz. Depending upon the programming of the associated network 310-313, mixers 328-331 use or select the appropriate LO frequency to generate front-end input signals 306-309 at the desired frequency. Signals 306-309 are then amplified and/or filtered in circuits 302-305 and provided to applications in networks 310-313.

The embodiment shown in FIG. 3 allows the user to select or program the function of front-ends 31-34 depending upon the type of network and applications to which access point 301 will communicate. For example, front end 31 is programmed to interface with a WLAN, such as wireless network compliant with the 802.11 a/b/c/d/e/f/g/h/n standards. Mixer 328 may select an LO in the 2.4 GHz or 5 GHz range to mix analog baseband signal 324 to the appropriate frequency for WLAN 310. Power amplifier 302 couples the signal to one or more antennae so the signals can be transmitted wirelessly in WLAN 310.

According to one embodiment, the LO frequencies may be changed or selected during the operation of the access point, for example when the access point changes from a WLAN multi-stream operation with 4 channels at one band to a WLAN multi-stream operation with 3 channels at one band and 1 channel at another band.

Front end 32 may be programmed to interface with a wired network via coax 311, which may be coupled to one or more televisions, set-top boxes, or other applications. Mixer 329 may select an LO of 900 MHz to mix analog baseband signal 325 to the appropriate frequency for coax network 311. Power amplifier 303 couples the signal to the coax cable so the signals can be transmitted.

Furthermore, front end 33 may be programmed to interface with a wired network, such as a telephone network using twisted pair wires 312. Mixer 330 may select an LO of 10 MHz to mix with analog baseband signal 326 or mixer 330 may simply pass signal 326 to line driver circuit 304. In one embodiment, the signals transmitted to twisted pair 312 are at 20 MHz. Line driver 304 couples the analog signal to twisted pair 312 for transmission to telephone, modems, set-top boxes, or other applications.

FIG. 3 also illustrates exemplary front-end embodiment 34, which couples digital baseband signals 319 to applications on power line network 313. In one operation embodiment, signals are transmitted over power line network 313 at 10 MHz. Mixer 331 selects an LO frequency to pass the analog signals to line driver 305, which couples the signals to power line network 313.

It will be understood, that the front-end circuits described above with respect to FIG. 3 also work in the opposite direction for received signals. For example, signals received from networks 310-313 are processed by front-ends 31-34, which down-convert and digitize the received signals and provide the digitized signals to MAC/BB processors 315.

Figure 4:
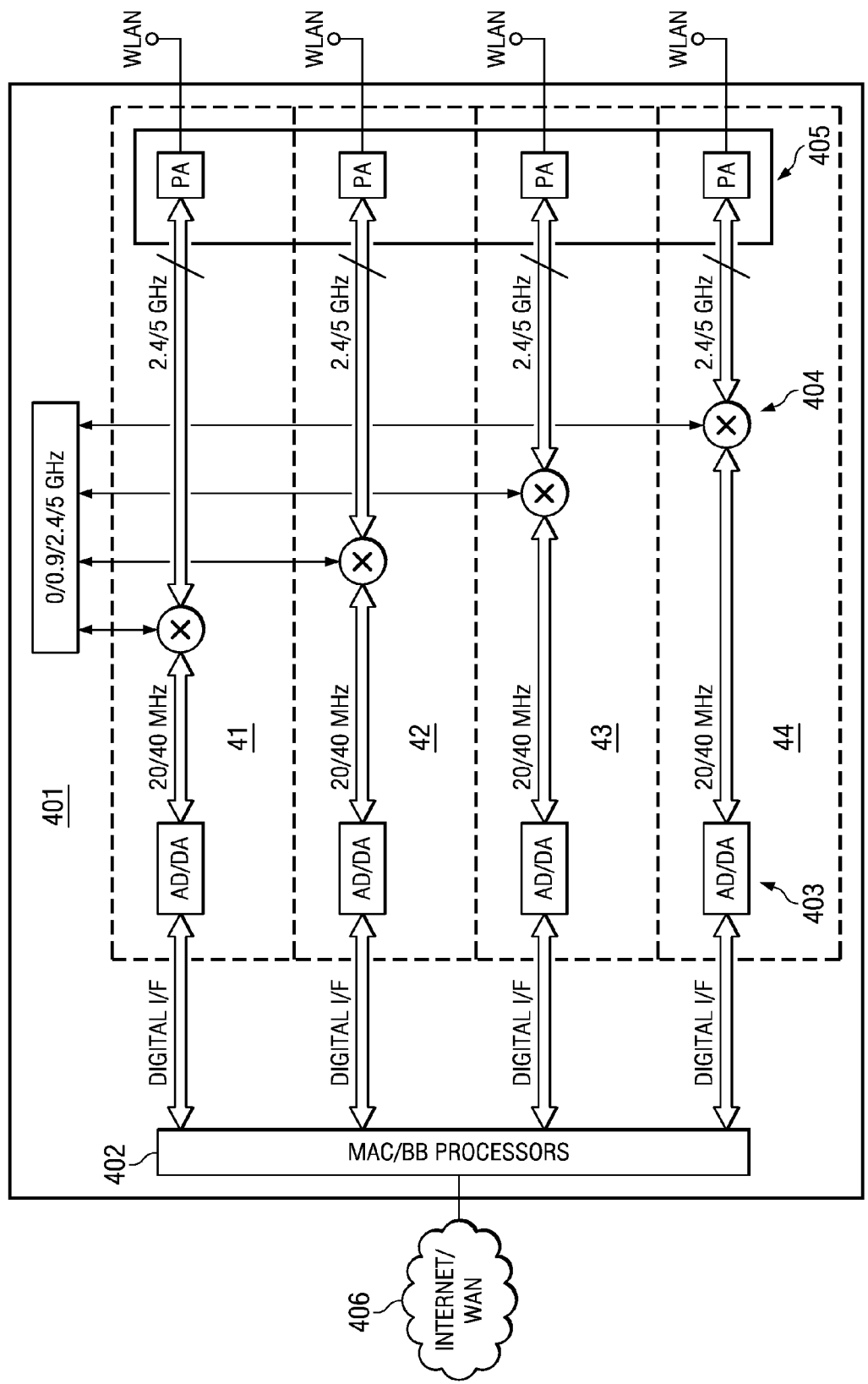
FIG. 4 illustrates an exemplary operation of the access point according to another embodiment of the invention.

FIG. 4 illustrates an operation mode of the access point 401 wherein the front-ends 31-34 are each configured or programmed to operate in a WLAN network, such as a wireless network complying with the 802.11n standard. In this operation, each of the AD/DA converters 320-323 receive digital signals from MAC/BB processors 315 and convert the signals to analog baseband signals, which are input to mixers 328-331. Mixers 328-331 select an LO frequency, such as in the 2.4 GHz or 5 GHz range, as appropriate to up-convert the analog baseband signals to a frequency assigned to a channel in the WLAN. The up-converted signals are amplified in power amplifiers 405 and coupled to antennae for transmission to other applications or clients in the WLAN. Signals may also be received from WLAN clients by access point 401. The signals are down-converted by mixers 328-331 to analog baseband signals, which are digitized in AD/DA converters 320-323. The digitized signals are coupled to the MAC/BB processors to be routed to network 314.

In one embodiment, each analog front-end 31-34 may be assigned to a different channel complying with the 802.11 standards. The channels assigned to each front-end 31-34 may be within a same frequency band, for example the 2.4 GHz band or the 5-5.8 GHz band. According to IEEE standards 802.11, the 2.4 GHz band ranges from 2.412 GHz to 2.462 GHz and is separated into eleven channels. In other standards, for example ITU standards, the 2.4 GHz band from 2.412 to 2.472 GHz is divided into thirteen channels. Channels are selected from the available channels and assigned to each front-end 31-34. Selection of the channels may take into account a separation of the channels to avoid interference, which may limits the number of channels available for front-ends 31-34.

In other embodiments, the channels assigned to front-ends 31-34 are selected from different bands. For example, one or more of the channels is selected from the 2.4 GHz band channels, while the other channels are selected from the 5 GHZ band channels. Selecting the channels from different bands provides an extended frequency separation and may release constraints in the RF processing due to closely located RF frequencies and interference caused thereby.

The operation illustrated in FIG. 4 may include, for example, use of a multiple-input/multiple-output (MIMO) technology in which each antenna and analog front-end 31-34 is attached to an RF chain that is responsible for transmitting and receiving a spatial stream. The access point is capable of providing flexible multi-stream operation such as a MIMO technique and/or a STBC technique and/or a beamforming technique. According to these techniques, a single data frame may be broken up and multiplexed across multiple spatial streams or may be transmitted in multiple streams to the transmitter. The streams are received and data frames are reassembled or calculated by the receiver based on the received streams. In one embodiment, each RF chain is capable of simultaneous reception and transmission, which allows for improved throughput. Simultaneous receiver processing may resolve multi-path interference and may improve the quality of the received signal.

It is to be noted that the usage of the same front end for multiple operation modes allows a flexible usage of the access point which may be in compliance with existing standards such as the IEEE 802.11n WLAN standard. According to this standard, the above multi-channel operations can be used to individually tailor usage of the access point in any of the 5 GHz band or a 2.4 GHz band according to all the variety which is offered by the standard. For example, in a first operation mode, four RF chains may be used for providing a MIMO operation with 4 channels (for example 4×4 MIMO) while in a second operation mode, the same four RF chains may be used such that three of the RF chains are used for a MIMO operation with three spatial streams in one band and one RF chain is used for an additional operation of a single WLAN channel in another band. Furthermore, the same access point, may then be used such that the three RF chains provide the MIMO operation with three spatial streams and the one RF chain provides a wired communication channel. It is to be understood that the above operations are only exemplary and that the analog front end may be programmed to allow any of the above mentioned multi-stream operation techniques with any number n of multi-streams.

Figure 5:
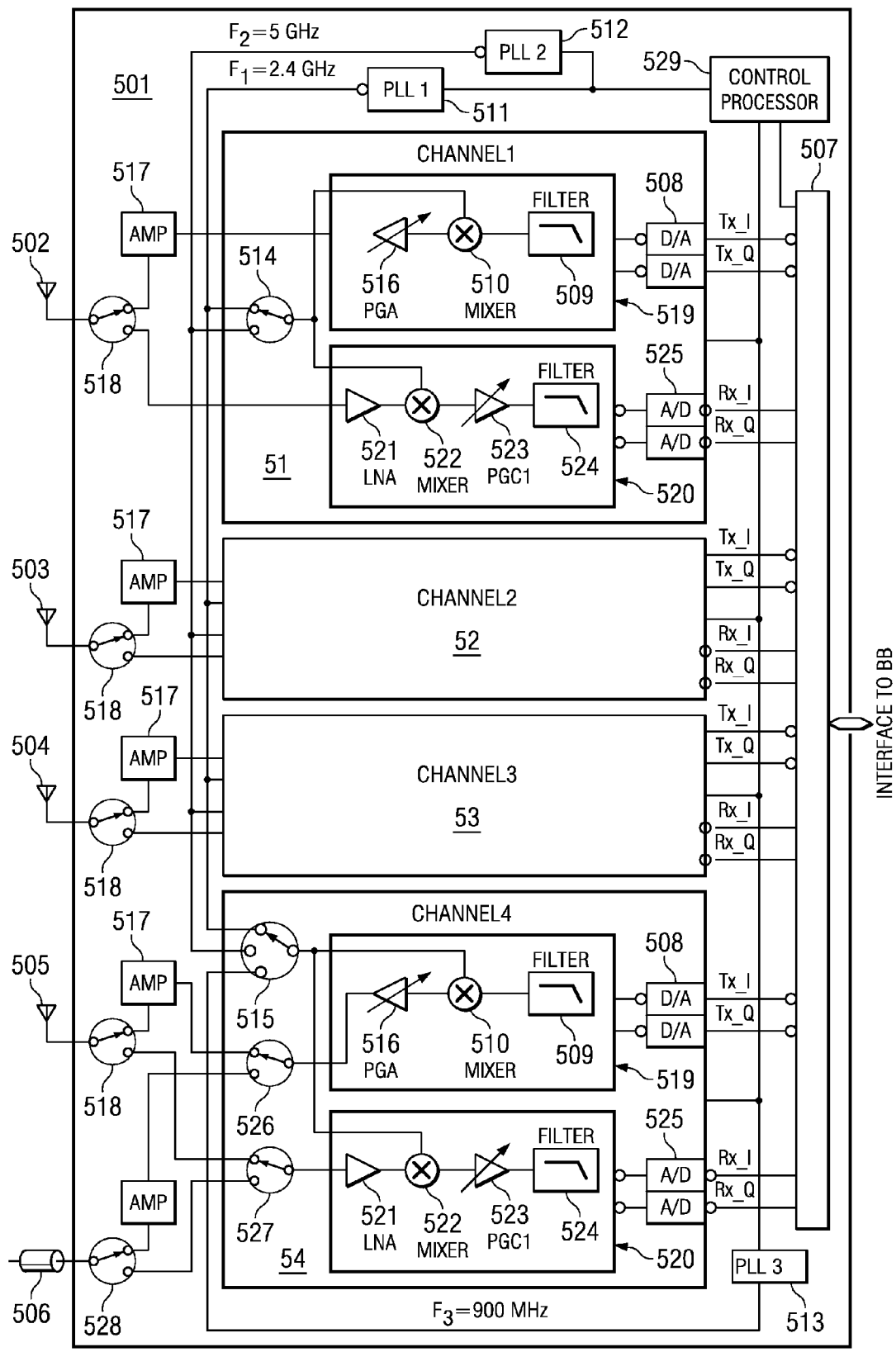
FIG. 5 illustrates front-end circuitry for use in embodiments of the invention.

FIG. 5 illustrates an exemplary operation of the front end portion of the access point. Front end 501 is configured to provide four channels 31-34. Channels 31-33 are configured to operate with antennae 502-504, and channel 34 is configured to selectively operate with either antenna 505 or coax 506. For purposes of simplification, the components of channels 32 and 33 are not shown in FIG. 5; however, it will be understood that in one embodiment, channels 32 and 33 are configured in the same manner as channel 31.

Switch 507 receives digital signals from MAC/BB processors and routes the digital signals to channels 31-34 as transmit I and Q signals. The digital transmit I and Q signals are received by D/A converters 508 and converted to analog baseband signals for further processing by up-conversion circuitry 519. The analog baseband signals in channel are filtered by low pass filter 509 and then up-converted to an RF frequency in mixer 510. Local oscillators 511-513 provide LO frequencies to channels 31-34. Depending upon the frequency of the WLAN or coax channel assigned to front-end channels 31-34, switches 514 and 515 are used to select the appropriate LO frequency. It will be understood that any LO signal may be selected for each mixer 510 so that each channel 31-34 may operate on any desired frequency, channel or band.

Local oscillators 511-513 may be phase locked loops (PLL) in one embodiment. PLL 511 is configured to provide an LO frequency of 2.4 GHz, and PLL 512 is configured to provide an LO frequency of 5 GHz. The LO signals from PLLs 511 and 512 may be used, for example, to up-convert signals for use in a WLAN based upon the 802.11 standards. The up-converted signals output from mixers 510 are then amplified in programmable gain amplifiers (PGA) 516. The output of amplifiers 516 may be further amplified by power amplifiers 517 before being transmitted via antennae 502-505 to client applications.

Switches 518 may be used to selectively couple antennae 502-505 to transmit circuitry 519 or receive circuitry 520 in front-end channels 31-34. Signals received from client applications at antennae 502-505 are routed to receive circuitry 520 via switch 518. The received signals pass for each channel through low noise amplifier (LNA) 521 and are then down-converted in mixer 522. In the illustrated embodiment, switches 514 and 515 provide the same LO signals to down-conversion mixers 522 that are selected for up-conversion mixers 510 since the transmit and receive signals are expected to be in the same frequency band for each channel. In other embodiments, switches 514 and 515 may be used to provide different LO frequencies for the transmitted and received signals if, for example, the signals were in different frequency bands or channels.

The down-converted signals, which are at baseband, pass through programmable gain control (PGC) circuitry 523 and are filtered in low pass filter 524. The analog baseband signals are converted to digital signal samples in A/D converters 525. The digitized signals are routed to the MAC/BB processors via switch 507.

In the embodiment illustrated in FIG. 5, channel 34 may be coupled to a WLAN or a coax network. Switch 526 is used to select between antenna 505 and coax 506 for transmission of the up-converted signals. Switch 515 is used to select between PPLs 511 or 512 for signals being broadcast in a WLAN application. If coax 506 is going to be used for transmission, then switch 515 is used to select PLL 513, which is configured to provide an LO frequency of about 900 MHz. Similarly, switch 527 is used to route received signals from either antenna 505 or coax 506 to down-conversion circuitry 520. Switch 528 may also be used to select between transmit and receive paths for coax 506.

In one embodiment, control processor 529 is coupled to channels 31-34, PLLs 511-513, and switch 507 to perform control and management functions for the front-end channels. If required, the control processor may provide coordination for multiple front-end components as well as for multiple MAC/BB entities. As used herein, control provided by control processor 529 is to be interpreted in a broad sense and may include managing functionalities for the different front-end components and data streams, such as assigning and dynamically reassigning frequencies, bands, or networks to the multiple front-ends in the access point. Control processor 529 may also control the physical transmission modes and RF bandwidths of front-end 501. Control processor 529 may be implemented in hardware, software, firmware or a combination of two or more of these components.

It will be understood that front-end channels 31-34 may be assigned to any combination for WLAN or cable networks. For example, in one embodiment, front-end channels 31-34 may all be assigned to a single WLAN network complying with 802.11n such that each channel is operating in a MIMO transmission mode to communicate with one or more client applications. In an alternative embodiment, two channels, such as channels 31 and 32, may be operating in an 802.11n MIMO transmission mode, while channel 33 operates in a legacy mode, such as one complying with 802.11 a/b/g, and channel 34 provides a front-end interface Although channel 34 has been described as capable of operating with either a wired or cable network, it will be understood that in other embodiments channel 34 may be configured to operate with any combination of two or more wireless and wired networks, including, without limitation, 802.11 networks, cable networks, twisted pair networks, and power line networks. Moreover, although FIG. 5 illustrates only channel 34 as capable of operating with more than one type of network, it will be understood that each of the front-end channels 31-34 may be adapted to operate with any two or more types of networks. The front-end channels may also be configured to operate with different wireless networks, such as by assigning two or more front-end channels to an 802.11n network and one or more separate front-end channels to one or more 802.11 a/b/or g networks.

In various embodiments, the components of the analog front-end circuits described herein may be constructed on the same or separate silicon. For example, the power amplifiers and line drivers that are coupled to the antennae, twisted pair, coax or power lines may be integrated on the same silicon as the mixers and AD/DA converters. Alternatively, the AD/DA converters may be constructed on separate silicon from the mixers and power amplifiers/line drivers. The AD/DA converters may be constructed on the same silicon as the MAC/BB processors in one embodiment. Alternatively, the AD/DA converters, the mixers and the power amplifiers/line drivers may all be constructed on separate silicon.

Embodiments of the present invention allows a user to select which media will be used for data transmission/reception, such as WLAN, coax, twisted pair, or power line. Depending upon the selected media, the one the mixing frequency needs to be changed to modify the analog front-end's ability to interface with the selected media. The selection of which media to use may be made dynamically by the user during operation in one embodiment, such as selecting media based upon channel quality. The media selection may also be made automatically by the access point to switch from one client application to another.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example the term "data" may be interpreted to include every form of representing the data, such as an encrypted form of the data, an analog or digital representation, a modulated signal representing the data etc. Furthermore, the terms "circuit" or "circuitry" used herein are to be interpreted in a sense not only including hardware but also software, firmware or any combinations thereof. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A front-end for an access point, comprising:
a plurality of programmable channel circuits, at least one programmable channel comprising:
an analog to digital converter configured to convert a digital baseband signal from a baseband processor to an analog baseband signal;
a transmission circuit configured to convert the analog baseband signal to an analog transmission signal of a selected one of a plurality of analog network types corresponding to different kinds of transmission media; and
a switching circuit coupled to an output of the transmission circuit, the switching circuit configured to selectively route the analog transmission signal to a first port configured to be coupled to a first kind of transmission media when the first of the plurality of analog network types is selected, and to a second port configured to be coupled to a second kind of transmission media when the second of the plurality of analog network types is selected.

2. The front-end of claim 1, wherein the programmable channel circuits comprise:
one or more mixers for up-converting baseband analog signals into radio frequency (RF) signals.

3. The front-end of claim 2, wherein the programmable channel circuits further comprise:
one or more mixers for down-converting received RF signals to baseband analog signals.

4. The front-end of claim 2, further comprising:
one or more local oscillator (LO) circuits for providing an LO signal to the one or more mixers.

5. The front-end of claim 2, wherein the one or more mixers are coupled to a selected one of a plurality of local oscillator (LO) circuits corresponding to the selected one of the plurality of analog network types.

6. The front-end of claim 1, wherein the programmable channel circuits further comprise:
power amplifiers for use with a wireless transmission medium or a coax transmission medium; or
line drivers for use with a selected twisted pair medium or a selected power line network type.

7. The front-end of claim 1, wherein the programmable channel circuits further comprise:
one or more mixers for up-converting baseband analog signals into radio frequency (RF) signals; and
one or more local oscillator (LO) circuits for providing an LO signal to the one or more mixers, wherein the one or more mixers are coupled to a selected one of the LO circuits corresponding to the selected one of the plurality of analog network types.

8. The front-end of claim 7, further comprising:
a control processor for selecting the LO signal to be used by each channel circuit.

9. The front end of claim 8, wherein the control processor is configured to control the LO signals such that the channel circuits operate in a first operation mode according to a MIMO technique and/or a STBC technique and/or a beam-forming technique and such that, in a second operation mode, a first group of the channel circuits operates according to a MIMO technique and/or a STBC technique and/or a beam-forming technique and a second group of one or more channel circuits operates to provide an additional wireless or wired data communication channel.

10. The front-end of claim 1, wherein the plurality of analog network types further comprises:
a wireless local area network type;
a cable network type;
a twisted pair network type; and
a power line network type.

11. The front-end of claim 1, wherein the digital baseband signal comprises transmit I and Q signals.

12. An access point for a data network, comprising:
a plurality of programmable front-end circuits coupled to MAC circuitry, wherein one or more of the plurality of front-end circuits comprises:
a conversion circuit configured to convert a received digital baseband signal from the MAC circuitry to an analog baseband signal of a selected one of a plurality of analog network types;
a transmission circuit configured to convert the analog baseband signal to an analog transmission signal of a selected one of a plurality of analog network types corresponding to different kinds of transmission media; and
a switching circuit coupled to an output of the transmission circuit, the switching circuit configured to selectively route the analog transmission signal to a first port configured to be coupled to a first kind of transmission media when the first of the plurality of analog network types is selected, and to a second port configured to be coupled to a second kind of transmission media when the second of the plurality of analog network types is selected; and
a plurality of local oscillators (LOs), each of the plurality of LOs configured to be selectively coupled to one of the plurality of programmable front-end circuit, wherein
a particular LO is selected for each front-end circuit based upon analog network types to which that front-end circuit is to be coupled,
the first of the plurality of analog network types is a wired network type, and
the second of the plurality of analog network types is a wireless network type.

13. The access point of claim 12, wherein each transmission circuit comprises:
a transmission path comprising an up-converting mixer; and
a receive path comprising a down-converting mixer, wherein a selected LO is coupled to both the up-converting mixer and the down-converting mixer.

14. The access point of claim 12, further comprising:
a controller for selecting an LO signal for each of the plurality of front-end circuits.

15. The access point of claim 14, wherein the controller selects the LO signal for each front-end circuit based upon a network assigned to that front-end circuit.

16. The access point of claim 12, wherein the LOs are selected based upon channels in a wireless network complying with an 802.11 standard.

17. The access point of claim 12, wherein:
the plurality of analog network types comprises a power line network type, a coax cable type, or a twisted pair wiring type;
the LOs are selected based upon channels of a coax cable network for a coax cable analog network type; or
the LOs are selected based upon channels of a wired network for a twisted pair wiring analog network type; or
the LOs are selected based upon channels of a power line network for a power line analog network type.

18. The access point of claim 12, wherein one or more of the plurality of front-end circuits are configured to be coupled to both an antenna and a cable or wire.

19. The access point of claim 12, wherein the digital baseband signal comprises transmit I and Q signals.

20. A method for providing an interface to an access point, comprising:
converting multiple digital data streams to separate analog baseband signals, the multiple data streams comprising digital baseband signals;
selecting a transmission format for a programmable front-end circuit configured to operate using a plurality of transmission formats, the plurality of transmission formats corresponding to different kinds of transmission media;
converting each of the analog baseband signals into an analog transmission signal using the programmable front-end circuit, wherein the format of each of the analog transmission signals is based upon a network to which the transmission signal is assigned, and wherein the programmable front-end circuit is configurable to operate over at least two of the different kinds of transmission media; and
selectively routing each analog transmission signal to one of a plurality of ports, corresponding to a transmission media of the selected transmission format, wherein a first port of the plurality of ports is configured to operate over a different kind of transmission media as a second port of the plurality of ports.

21. The method of claim 20, further comprising:
receiving a plurality of signals from one or more networks; and
down-converting the received plurality of signals into received analog baseband signals, wherein local oscillator signals used for each of the received plurality of signals are selected based upon a network from which the signal was received.

22. The method of claim 20, wherein the multiple digital data streams are received from MAC circuitry.

23. The method of claim 20, wherein the converting each of the analog baseband signals further comprises:
selecting a local oscillator signal based upon a network to which the signal is assigned.

24. The method of claim 20, wherein selecting the transmission format further comprises selecting the transmission signals from the group consisting of:
wireless local area network signals;
signals formatted for a cable network;
signals formatted for a wired network;
signals formatted for a twisted pair network; and
signals formatted for a power line network.

25. The method of claim 20, wherein the format of each of the transmission signals comprises a transmission frequency.

26. The method of claim 20, wherein converting each of the analog baseband signals into a transmission signal further comprises:
converting analog baseband signals into two or more transmission signals.

27. The method of claim 20, wherein the transmission signals are configured in a first operation mode according to a MIMO technique and/or a STBC technique and/or a beamforming technique and such that, in a second operation mode, a first group of the transmission signals operate according to a MIMO technique and/or a STBC technique and/or a beamforming technique and a second group of transmission signals operate to provide an additional wireless or wired data communication channel.

28. The method of claim 20, wherein the digital baseband signals comprise transmit I and Q signals.

29. A front-end for an access point, comprising:
a plurality of programmable channel circuits, each programmable channel circuit configured to convert a corresponding received digital baseband signal to an analog transmission signal, and selectively couple the analog transmission signal to a selected one of a plurality of analog network ports corresponding to different kinds of transmission media, wherein each of the plurality of programmable channel circuits are each configurable to operate over at least two of the different kinds of transmission media, and wherein the programmable channel circuits further comprise:
one or more mixers for up-converting baseband analog signals into radio frequency (RF) signals; and
one or more local oscillator (LO) circuits for providing an LO signal to the one or more mixers, wherein the one or more mixers are coupled to a selected one of the LO circuits corresponding to the selected one of the plurality of analog networks; and
a control processor for selecting the LO signal to be used by each channel circuit, wherein the control processor is configured to control the LO signals such that the channel circuits operate in a first operation mode according to a MIMO technique and/or a STBC technique and/or a beamforming technique and such that, in a second operation mode, a first group of the channel circuits operates according to a MIMO technique and/or a STBC technique and/or a beamforming technique and a second group of one or more channel circuits operates to provide an additional wireless or wired data communication channel.

30. The front-end of claim 29, wherein the digital baseband signal comprises transmit I and Q signals.

\* \* \* \* \*